June 30, 1925.  1,544,273

W. E. SAWYER

WEIGHING SCALE

Filed Feb. 23, 1923   3 Sheets-Sheet 2

W. E. Sawyer, Inventor

By C. A. Snow & Co.
Attorney

June 30, 1925. 1,544,273
W. E. SAWYER
WEIGHING SCALE
Filed Feb. 23, 1923 3 Sheets-Sheet 3

Inventor
W.E.Sawyer,
By C.A.Snow & Co.
Attorney

Patented June 30, 1925.

1,544,273

UNITED STATES PATENT OFFICE.

WALTER EDWARD SAWYER, OF JACKSONVILLE, FLORIDA, ASSIGNOR TO SAWYER SPECIALTY SCALES COMPANY, OF JACKSONVILLE, FLORIDA, A CORPORATION.

WEIGHING SCALE.

Application filed February 23, 1923. Serial No. 620,675.

*To all whom it may concern:*

Be it known that I, WALTER E. SAWYER, a citizen of the United States, residing at Jacksonville, in the county of Duval and State of Florida, have invented new and useful Weighing Scales, of which the following is a specification.

This invention relates to weighing scales designed primarily for use in weighing cotton bales although it can be employed for any other like services.

Where a number of weighing operations are to be carried out successively considerable time is usually wasted while the pointer or index finger operating over the dial oscillates prior to coming to a stop. In order to save time it is the practice for the operators to make a quick estimate of the approximate weight before the index or pointer stops its movement. Accuracy of measurement cannot thus be obtained but owing to the loss of time resulting from delays necessarily occurring where the operator waits for the pointer to come to a stop it has been found best to speed up the weighing operation at the expense of accuracy of reading the weights indicated.

One of the objects of the present invention is to provide dial scales which will quickly and accurately indicate the weight of the object suspended therefrom, means being employed whereby the parts are set by the application of a load to the scales after which the index or pointer is released so as to move to the position determined by the shifted mechanism.

Another object is to provide weighing scales the mechanism of which is simple, durable and efficient and will not readily get out of order.

With the foregoing and other objects in view which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings the preferred form of the invention has been shown.

In said drawings

Figure 4 is a section on line 4—4, Figure 3.

Figure 6 is a section on line 6—6, Figure 2.

Figure 1:
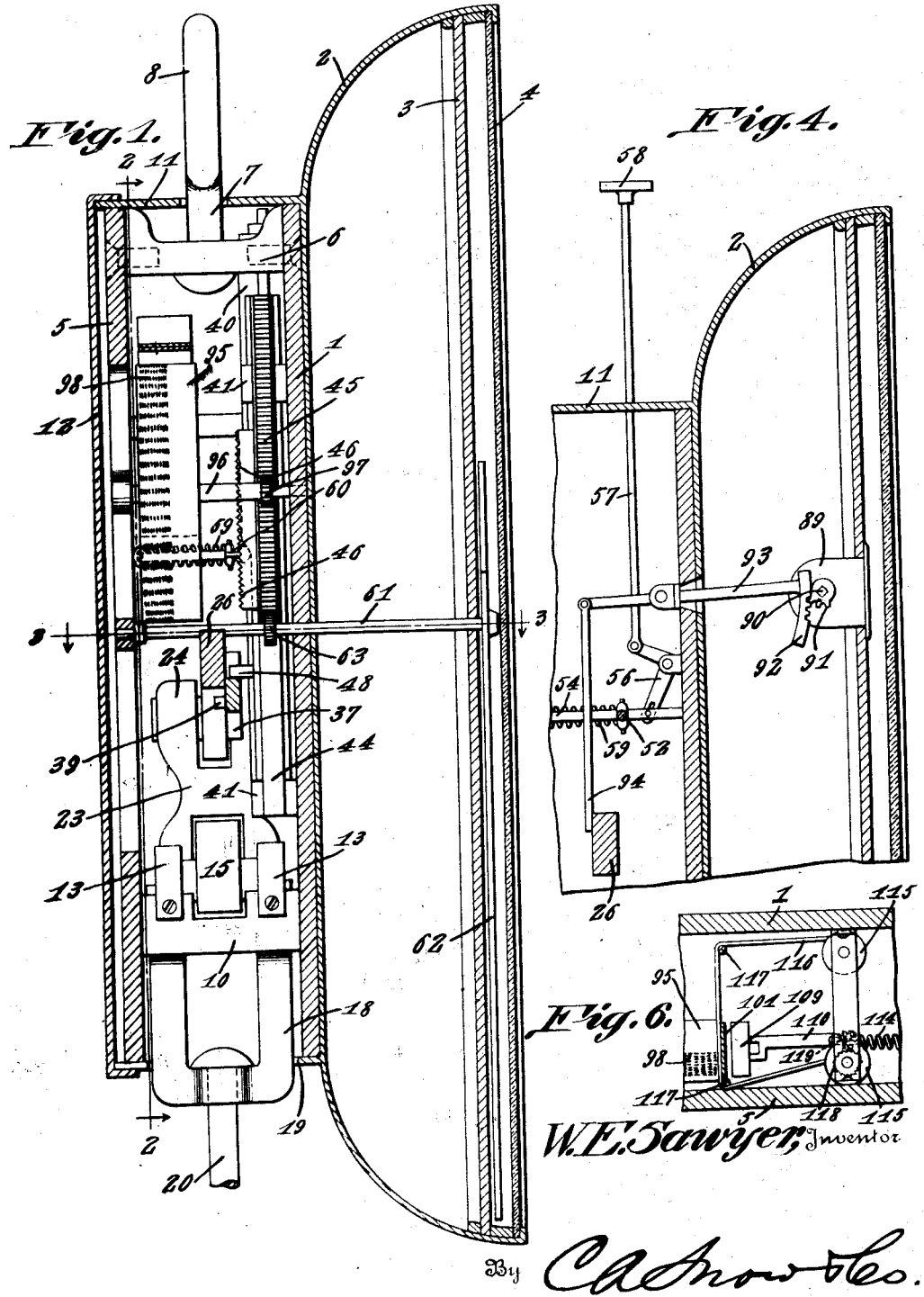
Figure 1 is a central vertical section through the scales.

Referring to the figures by characters of reference 1 designates the frame of the scales on which is mounted the housing 2 containing the dial 3, this dial being preferably covered by a transparent plate 4 of glass or other suitable material. The back portion 5 of the frame 1 is held fixedly by a cross strip 6 in which is swiveled the stem 7 of a supporting eye 8 or the like. Cross strips 9 and 10 also are attached to the back plate 5 as well as to the front portion of the body 1 and the dial stadium is arranged within a casing 11 having a closure 12 mounted on the rear portion thereof.

Retaining yokes 13 are secured to the strips 10 and bearing on this strip and extending under the yokes 13 are knife edges 14 projecting laterally from the sides of a beam 15 adjacent one end thereof. Additional knife edges 16 are extended laterally from this beam 15 between its ends and support eyes 17 provided at the upper ends of a yoke 18 extending through an opening 19 in the casing 11. A hook 20 is swiveled within the lower portion of the yoke as shown.

Extending laterally from the free end of the beam 15 are knife edges 21 projecting into and bearing downwardly upon eyes 22 provided at the lower ends of links 23. Eyes 24 are formed at the upper ends of these links and are supported by knife edges 25 extending laterally from a beam 26. This beam is provided near one end with laterally extending knife edges 27 projecting into the openings 28 which are attached to the strip 9, said knife edges bearing downwardly on the strip as shown particularly in Figure 2. A guide yoke 29 is mounted within the casing 11, it being pivotally supported on a cross member 10' carried by the frame of the scales. This yoke straddles the free end portion of the beam 26 and an antifriction roller 30 is mounted within this beam and is adapted to travel upwardly and downwardly within the yoke 29 and prevent the beam from becoming hung in the yoke. A stop screw 31 is mounted in the upper end of the yoke and is adapted to be secured in adjusted position by means of a lock nut 32. By means of this nut the beam 26 can be adjusted within the yoke 29 so as to be normally maintained at a predetermined elevation.

A cross strip 33 is mounted within the upper portion of the frame of the scales and has a bolt 34 adjustably connected thereto. A spring 35 connects this bolt to the beam 26 and is adapted to be inserted into any one of a series of openings 36 formed in the beam. Thus by means of the bolt 34 and by providing the opening 36, the tension of the spring 35 can be varied in order to effect the desired adjustment of the scales.

A cushioning lever 37 is pivotally connected to the beam 26 and is yieldingly supported at its free end by a spring 38 connected to said beam 26. This cushioning lever has a laterally projecting lug 39 which is normally thrust against the beam 26 by the spring 38. When the cushioning lever 37 receives a downward impact, however, it is free to move downwardly relative to the beam 26, at the same time placing the spring 38 under increased tension.

Figure 2:
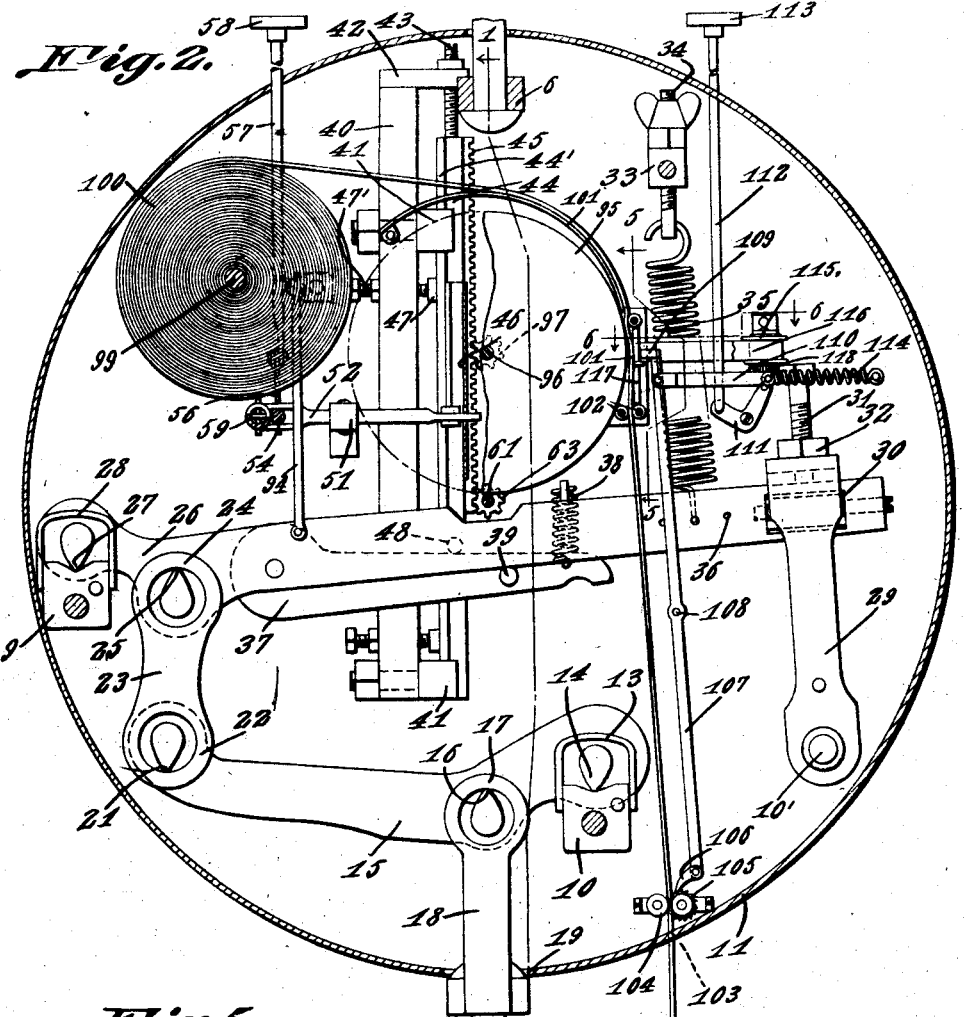
Figure 2 is a section on line 2—2, Figure 1.
Figure 5:
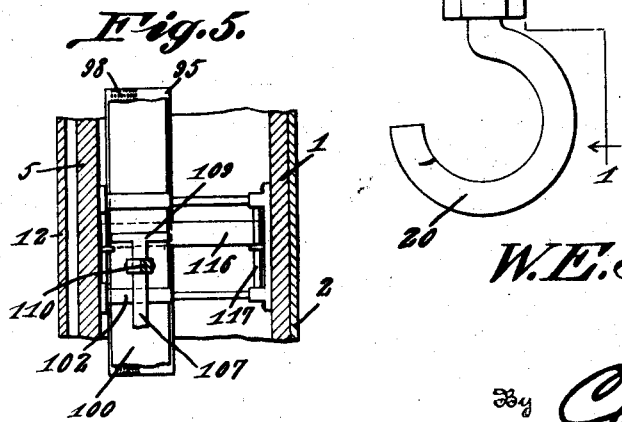
Figure 5 is a section on line 5—5, Figure 2.

Secured within the casing 11 is a supporting strip 40 to one face of which are secured guide blocks 41. An end block 42 is extended from the upper end of the strip 40 and has an adjusting screw 43 extending downwardly therethrough and engaging the end of a rack bar 44. This rack bar has side flanges 44' slidably engaging the blocks 41. The teeth of the rack bar have been indicated at 45 and extending laterally from the rack bar is a longitudinal series of ratchet teeth 46. Pressure blocks 47 are in engagement with the back face of the rack bar 44 and are held thereagainst by set screws 47'. A stud 48 is extended laterally from the rack bar and overhangs the cushioning lever 37. When the cushioning lever and the beam 26 are in their normal positions this stud 48 is adapted to rest on the cushioning lever as shown in Figure 2.

Figure 3:
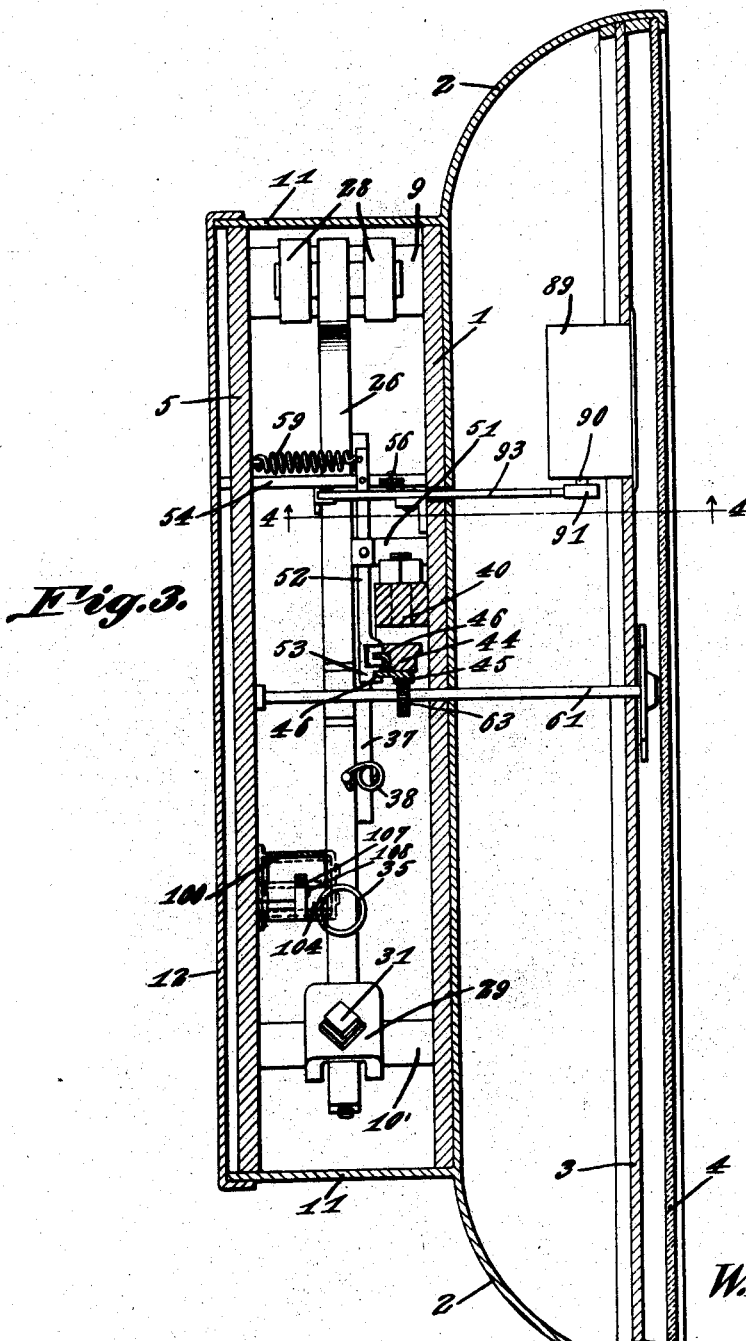
Figure 3 is a section on line 3—3, Figure 1.

A bracket 51 is mounted within the casing 11 and fulcrumed thereon is a lever 52 adapted to engage the ratchet teeth 46, this lever being provided with a head 53 as shown particularly in Figure 3. A rod 54 is slidably mounted within the frame 1 and back plate 5 and is pivotally connected by the forked end of the lever 52. A bell crank lever 56 is connected to the rod 54 and also to an actuating rod 57 which is slidable within the casing 11 and has a button 58 at its outer end. A spring 59 serves to hold lever 52 normally in engagement with the ratchet teeth 48. By depressing the rod 57, however, lever 52 will be shifted so as to become disengaged from the ratchet teeth 46.

A shaft 61 extends through the frame 1 and dial 3 and carries an index or pointer 62 adapted to work over the face of the dial 3. This shaft has a gear 63 thereon which meshes with the teeth 45 of the rack bar 44.

A counter 89 is supported by the dial 3 and is adapted to be operated by a shaft 90 to which is secured a segmental gear 91. This gear is adapted to be operated by a toothed segment 92 formed at one end of a lever 93. This lever is connected by a link 94 to the beam 26.

It is to be understood that when a load is placed in engagement with the hook 20 it will promptly pull downwardly on beam 15 which, in turn, will pull through the link 23 upon the beam 26 and against the tension of the spring 35. Thus the cushioning lever 37 will be swung downwardly away from the stud 48 and the link 94 will operate the counting mechanism so as to indicate one weighing operation. The parts described move promptly to their new positions when subjected to the weight of the load and immediately thereafter the operator depresses the button 58. This causes the ratchet lever 52 to move out of engagement with the teeth 46. As a result the rack bar 44 will promptly moved downwardly under its own weight until the stud 48 comes against the cushioning lever 37 whereupon it will stop abruptly. This downward movement of the rack bar will be sufficient to rotate shaft 61 and the index or pointer 62 so as to indicate accurately the weight of the load. When the load is removed from the scales the parts will all be returned automatically to their initial positions by the springs 35 and 38.

Obviously by providing scales such as described the weighing operations can be made in rapid succession as no time is lost while the operator is waiting for the indicating hand or pointer to come to a stop.

For the purpose of printing the results of the successive weighing operations it is preferred to provide the scales with a printing mechanism. This includes a disk 95 secured to and adapted to rotate with a shaft 96 having a small gear 97 meshing with the rack 45. Thus during the longitudinal movement of the rack the disk 95 will be rotated thereby to bring any one of the series of numerals 98 to a predetermined printing position. These numbers are in the form of raised type for printing the weight indicated by the scales. A spool 99 carrying a paper tape 100 is mounted within the casing 11 and the paper tape is adapted to extend over an arcuate guide 101 and downwardly past guide rollers 102 through an opening 103 in the periphery of the casing. This tape is pinched between rollers 104, one of which has a ratchet wheel 105 engaged by a pawl 106 pivotally connected to the lower arm of a lever 107. This lever is fulcrumed at 108 and its upper end has a hammer head 109. A link 110 is connected to this lever and to one arm of a bell crank 111, the other arm of the bell crank being engaged by an operating rod 112 extending from the casing 11, and having a button or key 113. A spring 114 is connected to link 110 and serves to hold the hammer head 109 normally retracted out of contact with the tape 101.

Spools 115 are mounted in the casing and carry an inked ribbon 116 which is extended between guide rods 117 (see Fig. 6), and between the paper tape 101 and the disk 95. One of the spools 115 can be provided with a ratchet wheel 118 for engagement by a pawl 119 carried by the link 110.

From the foregoing it will be apparent that each time the rack 45 is released and drops until limited by beam 26, the disk 95 will rotate and bring to printing position the type designating the weight of the material suspended from the scales. The operator then drives key 113 downwardly so that bell crank 111 will shift link 110 and throw head 109 against the paper tape and thrust said tape against the inked ribbon and the positioned type. Thus there will be printed on the tape the weight of the material on the scales and when the key 113 is released, the spring 114 will return lever 107 and head 109 to their initial positions. This will cause pawl 106 to rotate ratchet wheel 105 one notch, thereby pulling the tape 101 longitudinally to bring a clear space thereon into position to receive the next impression printed from the type. Each time the load is removed from the scales, the mechanism is of course returned to normal position and during this action the rack 45 will return the disk 95 to its initial position. Each movement of link 110 in one direction will move the inked ribbon a slight distance as will be obvious.

What is claimed is:—

1. In weighing scales the combination with a yieldingly supported beam, a load engaging member, and means for transmitting the weight of the supported load from said member to the beam, of a slidable rack, adjustable guiding means therefor, an indicator operated by the rack, means for holding the rack normally against movement, a yieldingly restrained cushioning lever carried by the beam, means cooperating with said lever for limiting the descent of the rack when released from normal position, a plunger, and means operated by the plunger for releasing the rack.

2. In weighing scales with weight indicating means, and a disk rotatable therewith, of a rack for actuating said weight indicating means, means for rotating the disk with the weight actuating means, said rack being movable by gravity, means for holding the rack normally against movement, impression elements upon the disk, a hammer adjacent the disk, an inked ribbon movable across the path of the hammer, a beam, means for transmitting the weight of a load to the beam, said beam being yieldingly supported, a cushioning lever yieldingly connected to the beam, means for releasing the rack to rotate the weight indicating means and disk, means cooperating with the cushioning lever for stopping the movement of the rack, and means for actuating the hammer.

3. Weighing scales including a disk, impression means thereon, a gravity operated rack, means actuated by the rack for rotating the disk, a beam, means for transmitting the weight of a load to the beam, said beam being yieldingly supported, a yieldingly restrained lever fulcrumed upon the beam and constituting a cushioning stop, means for holding the rack against movement, a hand operated plunger for releasing the rack, means movable with the rack for engaging the cushioning lever to stop the rotation of the disk, means for driving a tape across the disk, an inked ribbion, a hammer, plunger operated means for actuating the hammer, and means operated by the hammer for feeding the tape.

4. In weighing scales the combination with weight indicating means and a gravity operated rack for actuating the same, of means for holding the rack against movement, a plunger for releasing the rack, a beam, means for transmitting the weight of a load to the beam, a yieldingly restrained lever carried by the beam, and means movable with the rack and against said lever for yieldingly stopping the descent of the rack when brought to the limit of its movement determined by the position of the beam and lever.

In testimony that I claim the foregoing as my own, I have hereto affixed my signature in the presence of two witnesses.

WALTER EDWARD SAWYER.

Witnesses:
L. A. RAULERSON,
R. D. GORDON.